Aug. 18, 1953 — R. C. BARBATO — 2,649,272
IRIS TYPE VALVE CONSTRUCTION
Filed March 31, 1950 — 2 Sheets-Sheet 1
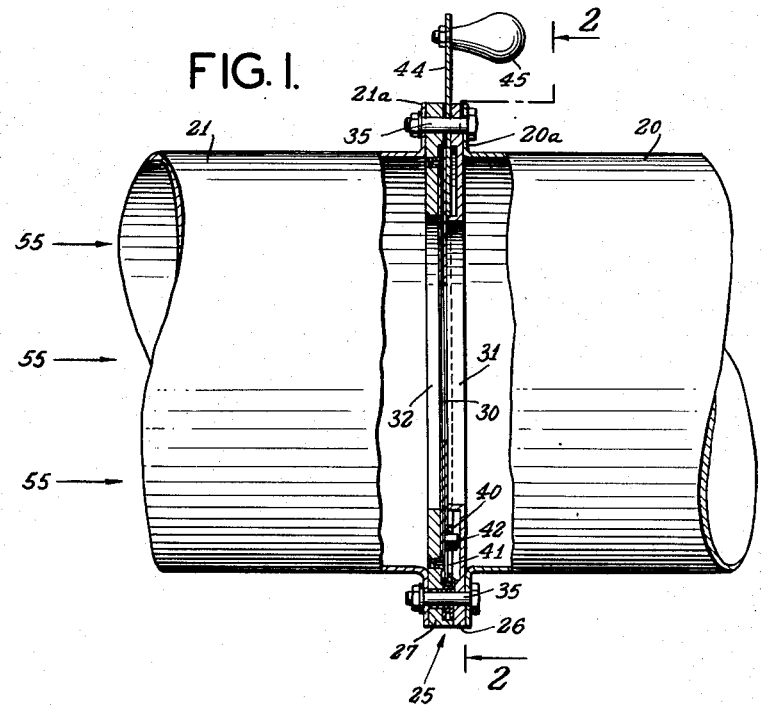
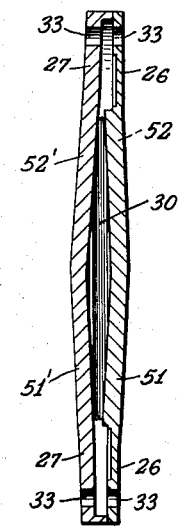
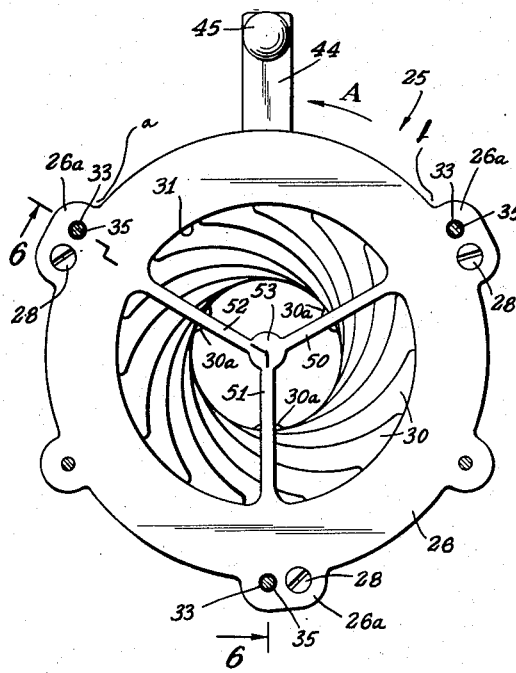
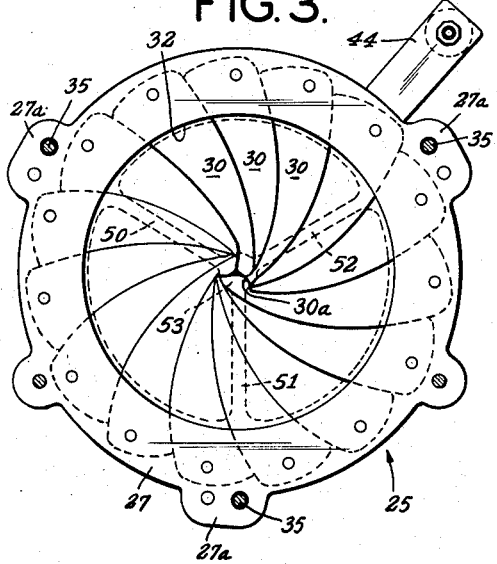
INVENTOR
ROBERT C. BARBATO
BY
ATTORNEY Aug. 18, 1953 R. C. BARBATO 2,649,272
IRIS TYPE VALVE CONSTRUCTION
Filed March 31, 1950 2 Sheets-Sheet 2

INVENTOR
ROBERT C. BARBATO
BY
ATTORNEY

Patented Aug. 18, 1953

2,649,272

UNITED STATES PATENT OFFICE 2,649,272

IRIS TYPE VALVE CONSTRUCTION

Robert C. Barbato, New York, N. Y.

Application March 31, 1950, Serial No. 153,155

7 Claims. (Cl. 251—18)

My invention relates to air flow control valves for use in air conditioning systems for aircraft, railroad cars, marine vessels and other air conditioning systems.

More particularly my invention is directed toward improvements in the type of valves for controlling the flow of air and employing iris shutter construction.

One of the objects of my invention is to provide an improved iris shutter type air valve for controlling the flow of air in which leakage, when the valve is closed, will be entirely eliminated or reduced to a minimum even when used with air under relatively high pressure, and which will at the same time be capable of opening or closing smoothly and quickly.

Another object of my invention is to provide an improved iris shutter type air control valve which is so constructed and arranged as to prevent bellowing of the vanes of the shutter when the valve is closed due to the pressure of the air trying to pass through.

A further object of my invention is to provide an iris shutter air control valve of the class described in which novel means are provided for operating the valve either locally or by remote control means.

A still further object of my invention is to provide an improved iris shutter type air control valve of the character described which shall be so designed as to overcome or reduce to a minimum friction between the moving parts thereby providing smooth operation and longer service life of the valve.

Still another object of my invention is to provide a valve of the iris shutter type to control the flow of fluid which shall comprise relatively few and simple parts, which shall operate smoothly and quickly with minimum torque at temperature extremes and yet be sealed against leakage and which shall be capable of withstanding the usual aircraft vibrations.

Other objects of my invention will become apparent from the description of the invention to follow, or will hereinafter be more fully pointed out.

In the accompanying drawings,

Fig. 1 is a vertical sectional view of a valve of the iris shutter type for use in controlling the flow of air for air conditioning units for aircraft, constructed and arranged in accordance with my invention, certain portions of the air duct being in elevation;

Fig. 2 is a cross-sectional view taken substantially along the line 2—2 of Fig. 1, showing the iris shutter partially closed;

Fig. 3 is a view similar to Fig. 2, but as viewed from the opposite side thereof and with the iris shutter in fully closed position;

Fig. 10 is a cross-sectional view similar to Fig. 6, but illustrating a modification of my invention.

Figure 4:
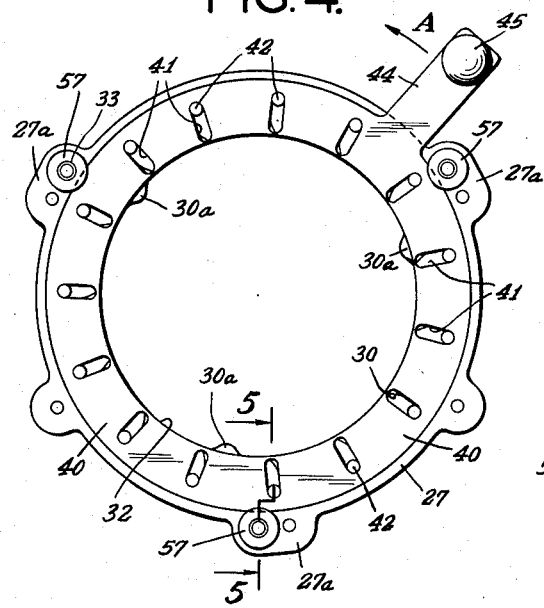
Fig. 4 is an elevational view of the device shown in Fig. 2, but with the top plate removed to reveal the mounting of the pin actuating plate and with the valve in fully opened position.

Referring now in detail to the drawings and more particularly to Figs. 1 through 7 thereof, I have shown a valve constructed and arranged according to my invention and for purposes of illustration illustrated as effectively positioned across the path of flow of air through a duct, it being understood that the valve may be employed for other purposes as well.

As best seen in Fig. 1, the duct comprises the tubular sections 20 and 21 in axial alignment. The sections 20 and 21 are provided with outwardly extending flanges 20a and 21a respectively which are adjacently disposed and spaced from each other a sufficient distance to accommodate between them the valve of my invention designated generally by the numeral 25.

The valve 25 comprises a pair of cooperating annular discs 26 and 27, designed to house, between them, a plurality of iris leaves or vanes designated by the numeral 30 of any well known type of construction, shape and function, such, as for example, the set of iris leaves, disclosed in U. S. Patent No. 2,321,336 to Albert W. Tondreau. The disc 26 is provided with a central opening 31 in substantial alignment with an opening 32 in the disc 27. The discs 26 and 27 are substantially coextensive and are designed to contactively engage each other at their peripheral margins and held in assembled relationship by means of screws 28 passing through the disc 26 and threadedly received in the disc 27. The discs 26 and 27 are provided with a plurality of circumferentially disposed corresponding lug portions 26a and 27a having aligned through apertures 33 which are axially aligned with apertures in the flanges 20a and 21a and adapted to receive therethrough the bolts and nuts 35 for holding the valve 25 in proper air sealing position between the duct sections 20 and 21.

As noted in Fig. 4, the disc 27 is provided with a ring plate 40 provided with slotted openings 41 to receive pins 42 fixed to the iris leaves 30 in the customary manner for iris shutters so that when the ring 40 is rotated axially in a clockwise direction as viewed from Fig. 4, the shutter will be opened and when moved in the direction of the arrow A (see Figs. 2 and 4) the shutter will be gradually closed until completely closed, as shown in Fig. 3.

The ring plate 40 is provided with an integral extension 44 extending radially therefrom to form a handle member for the manual operation of the iris leaves to open or close the valve. The discs 26 and 27 are provided with aligned notched portions extending from approximately the point a to the point b as best seen in Fig. 2, to permit the free travel of the said handle 44. To facilitate the manual operation of the handle 44 there may be provided a suitable knob member 45.

In the types of iris shutter valves heretofore manufactured it was found that the shutter vanes tended to bellow when the valve was closed due to the pressure of the air attempting to pass through. This bellowing began at the weakest section of the valve, namely, the center and caused the vanes of the shutter to become concaved or dish-shaped. Repeated bellowing cause permanent deformation of the center locking vanes resulting in excessive leakage, eventual sticking and failure of the valve to open or close. In accordance with my invention I have provided the following means for overcoming these disadvantages, just described.

As best seen in Figs. 2, 3, 6 and 7, I provide one of the discs, such as, for example, the disc 26 with a spider comprising the three legs 50, 51 and 52, integral with the said valve disc 26 and joined together at the center of the valve so as to form an enlarged area 53. This enlarged area 53 being disposed at the exact area where the three vanes interlock provides a protective covering to eliminate leakage. As noted in Fig. 1, the spider is so positioned that when the air flows through the duct in the direction of the arrows 55 the pressure of the air will press the vanes 30 against the legs 50, 51 and 53 and thus prevent deformation since the spider acts as a backing plate for the vanes. The legs 50, 51 and 53, are made relatively thin to minimize the restriction of air flow through the valve opening.

Figure 6:
Fig. 6 is a fragmentary cross-sectional view taken substantially along the line 6—6 of Fig. 2.

It is noted that the spider is so constructed as to guide the three locking vane portions 30a therealong in opening and closing by means of a slight taper as best seen in Fig. 6. I have found that satisfactory results are obtained when the taper is approximately .008 per inch from the center of the spider to the outside diameter thereof. This taper also compensates for the variation in thickness of the adjusting vanes 30, due to the fact that in adjusting the valve to desired degrees of opening there is a corresponding variation in the thickness of the stack of vanes. Hence, by slightly tapering the spider from the center to the outside diameter, space is provided for the stacking of the vanes where required. It is thus seen that by the above described construction smooth operation of the valve will result.

Figure 7:
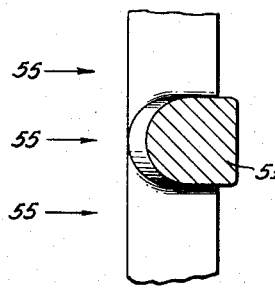
Fig. 7 is an enlarged cross-sectional view taken substantially along the line 7—7 of Fig. 6.

As best seen in Fig. 7 the edges of the legs 50, 51 and 53 of the spider facing the flow of air, and on which the vanes 30 are guided are rounded to provide additional smooth operation of the valve.

To further overcome leakage at high pressure and to insure the iris vanes against bellowing if desired as clearly shown in Fig. 10, I may provide a second spider integral with the disc 27 and comprising the legs $50^1$, $51^1$ and $52^1$ meeting at an enlarged button-like center $53^1$. The legs and center portion of this second spider being identical in structure, function and purpose as that of the legs 50, 51 and 53 of the spider integral with the disc 26. By this construction I provide a backing plate in front of as well as in back of the vanes.

It has been found that in other types of iris shutter valves heretofore used, great friction is encountered in rotating the annular disc designed to move the vanes, often resulting in the vane pins being pulled from their riveted or spot welded joints. As a matter of fact the pulling out or dislocation of one pin will cause jamming of the valve. I have therefore, in accordance with my invention, provided the following novel means for mounting the movable ring 40 whereby to reduce friction to a minimum encountered under high pressure and to relieve the stress on the pins.

Figure 5:
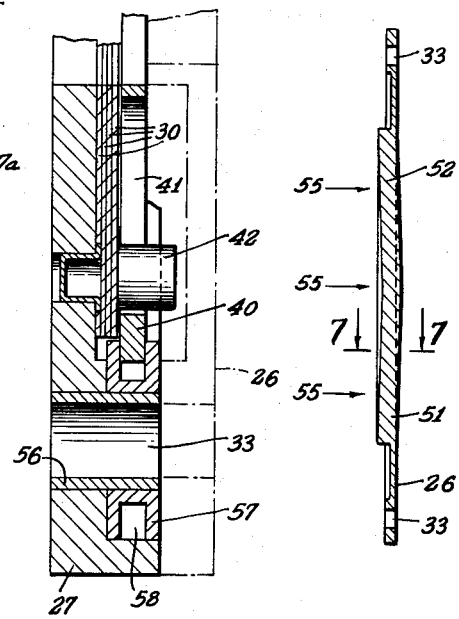
Fig. 5 is an enlarged cross-sectional view taken substantially along the line 5—5 of Fig. 4.

As best seen in Figs. 4 and 5, each aperture 33 in the disc 27 is provided with a bushing 56. Surrounding each bushing 56 is a recessed area into which there is received a roller 57, freely rotatably mounted on the bushing 56. The rim of each roller 57 is provided with a circumferential recess 58.

The diameters of the rollers 57 are of such size and the recesses 58 are of such width as to snugly receive in such recesses 58 an edge portion of the movable ring 40.

It is thus seen from the above described construction that when the ring 40 is rotatably moved by the handle 44, it will be guided and centered by the disc 27 which forms a portion of the casing and is supported against end thrust by the three rollers 57 which will turn when the ring 40 is turned, thus minimizing friction. It is noted also that by the above described construction I am able to produce an iris shutter valve suitable for use for high pressure applications which has heretofore been impossible with a valve of iris shutter construction due to the great amount of friction encountered with the moving parts and the resulting resistance to torque when opening or closing the valve.

While in Figs. 1 through 7 I have shown, and have described the operation of my valve by local manual means, my invention also contemplates the use of remote control by electrical means. To this end I provide the following mechanism illustrated in Figs. 8 and 9.

I provide a pair of discs 66 and 67 designed to house between them the set of vanes 30 comprising the iris shutter previously described and operated by the movable ring 60 through the pins 42 and slots 41. The disc 66 is similar in construction and function to that of the disc 26. Similarly the disc 67 is the same in all respects to that of the disc 27 except for the integral upwardly extending portion 67a. The discs 66 and 67 are so designed as to provide between them a housing for a pinion 70 mounted on a shaft 71 for rotation therewith. The shaft 71 is journaled in a casing C. The casing C is mounted on the extending portion 67a of the disc 67, by suitable screw members 80. The shaft 71 is connected to the motor M so that when the motor is energized to rotate shaft 71 and pinion 70 meshing with teeth 78 of movable ring 60, the movable ring 60 is rotated. A protective casing 77 may be provided for the motor M.

Figure 8:
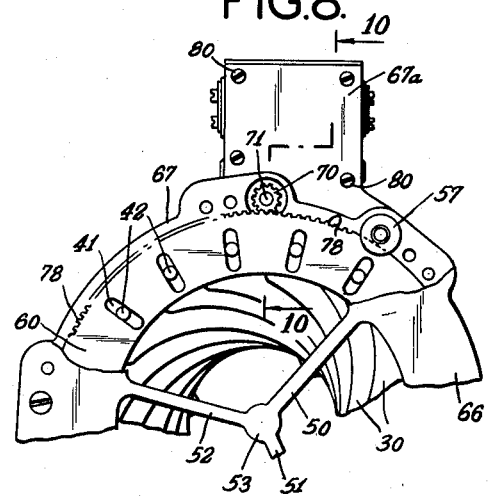
Fig. 8 is a fragmentary view of the device shown in Fig. 2, but with certain portions of the outer plate broken away to reveal the interior construction thereof and illustrating a modified form of valve operation means.
Figure 9:
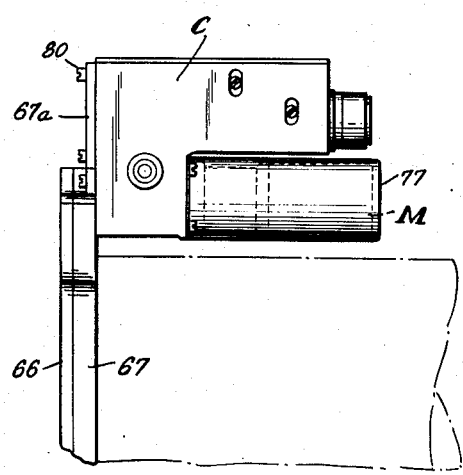
Fig. 9 is an end elevational view thereof, as viewed from the right side of Fig. 8.

As best seen in Fig. 8, the ring 60 is similar in construction to that of the ring 40, except that over a predetermined arc of its periphery there are provided a series of gear teeth designed to mesh with the pinion 70.

It is thus seen from the above described construction that when the motor is energized to rotate the pinion 70, the ring 60 will be rotated to close or open the iris shutter as desired.

While in the drawings I have illustrated my novel valve and have described the same in connection with the use for the control of the flow of air, it is understood that my valve may also be satisfactorily employed to control the flow of fluids and light and my invention extends to such use.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the intention extends to such use.

I claim:

1. In a valve of the class described for controlling the flow of fluid through a duct or similar tubular member wherein a pair of annular discs are mutually interconnected to form a space therebetween, and in which space an iris shutter composed of a plurality of pivotally mounted vanes is housed, and in which pins are provided on said vanes, a ring member having radially arranged slotted openings therein receiving said pins therein, whereby upon axial rotation of said ring, said vanes will be adjustably moved to open or close said valve, the improvement which comprises providing at least one of said annular discs with an integral, rigid spider portion, said spider portion comprising a plurality of legs meeting at the center of said disc to serve as a backing plate to prevent bellowing of said vanes when the valve is in closed position, said spider legs being tapered from the center thereof to the outside diameter to provide a compensating space for the stacking of the vanes when required.

2. A valve according to claim 1 in which said ring member is provided over a predetermined area of its periphery with a series of gear teeth, a rotatably supported gear member in mesh with the gear teeth on said ring member, and means for causing rotation of said gear member to rotate said ring member whereby to operate said valve.

3. A valve according to claim 1 in which each of said discs is provided with an integral rigid spider, and in which the spider legs of each spider are tapered from the center thereof toward the outside diameter and in which the tapers of the legs of the two spiders are in opposed relationship with the greater space between them being at the center of the spiders.

4. In a valve of the class described for controlling the flow of fluid through a duct or similar tubular member wherein a pair of annular discs are mutually interconnected to form a space therebetween, and in which space, an iris shutter composed of a plurality of pivotally mounted vanes is housed, and in which pins are provided on said vanes, a ring member having opposed planar surfaces and having radially arranged slotted openings for receiving said pins, whereby upon axial rotation of said ring, said vanes will be adjustably moved to open or close said valve, spacing means for mounting said ring between said discs for axial rotational movement, said spacing means being interposed between said ring and said discs and comprising a plurality of roller members contactively engaging opposed peripheral portions of said ring for maintaining said ring planar surfaces free from direct axial contact with the inner planar face of each of said discs; one of said discs having an axially disposed shoulder, said shoulder having an inner annular surface; said ring member having an outer annular surface slidably engageable with said inner annular surface, which engagement serves to guide and center said ring with respect to said discs, and means to rotate said ring to operate said valve.

5. In a valve of the class described for controlling the flow of fluid through a duct or similar tubular member, wherein a pair of annular discs are mutually inter-connected to form a space therebetween, and in which space an iris shutter composed of a plurality of pivotally mounted vanes is housed, and in which pins are provided on said vanes, a ring member having opposed planar surfaces and having radially arranged slotted openings for receiving said pins, whereby upon axial rotation of said ring, said vanes will be adjustably moved to open and close said valve, means for mounting said ring member between said discs for rotational movement, said means comprising a plurality of supporting members mounted on one of said discs, the rim of each supporting member being provided with a recess forming flanges on opposite sides thereof, said recess partially receiving therein an edge portion of said ring member with said flanges being interposed between opposite peripheral portions of said ring member planar surfaces and adjacent surfaces of said annular discs, whereby said ring member is axially supported by said supporting members and in spaced relationship with respect to the inner planar faces of each of said discs; one of said discs having an axially disposed shoulder having an inner annular surface; said ring member having an outer annular surface slidably engaging said inner annular surface, which engagement serves to guide and center said ring with respect to said disc.

6. In a valve of the class described for controlling the flow of fluid through a duct or similar tubular member wherein a first annular disc and a second annular disc are mutually interconnected to form a space therebetween, and in which space an iris shutter composed of a plurality of pivotally mounted vanes is housed, and in which pins are provided on said vanes, a ring member having opposed planar surfaces and having radially arranged slotted openings for receiving said pins whereby upon axial rotation of said ring said vanes will be adjustably moved to open or close said valve, means for mounting said ring between said discs for axial rotational movement, said means comprising circumferentially disposed lugs, extending beyond the outer periphery of said first disc, apertures in said lugs, a bushing in each aperture, a recessed area extending inwardly from one surface of said ring member and surrounding said bushing, a roller member freely rotatably mounted on each bushing and disposed in said recessed area, the rim of each roller being provided with a curcumferential recess partially receiving therein an edge portion of said ring member planar surfaces, whereby the opposite peripheral planar surfaces of said ring member are axially supported out of contact with the adjacent inner planar face of each of said first and second discs to minimize friction; said first disc having an axially disposed shoulder having an inner annular surface, said ring member having an outer annular surface slidably engaging said inner annular surface, which engagement serves to guide and center said ring with respect to said first discs.

7. A valve according to claim 6 in which said ring member is provided over a predetermined area of its periphery with a series of gear teeth, a rotatably supported gear member in mesh with the gear teeth on said ring member and means for causing rotation of said gear member to rotate said ring member whereby to operate said valve.

ROBERT C. BARBATO.

References Cited in the file of this patent

UNITED STATES PATENTS

| Number | Name | Date |
| --- | --- | --- |
| 848,739 | Gut | Apr. 2, 1907 |
| 887,253 | Jackson | May 12, 1908 |
| 1,240,073 | Marks | Sept. 11, 1917 |
| 1,350,610 | Henig | Aug. 24, 1920 |
| 1,407,216 | Potter | Feb. 21, 1922 |
| 1,508,138 | Foote | Sept. 9, 1924 |
| 2,019,244 | Bergesen | Oct. 29, 1935 |
| 2,307,273 | Hughes | Jan. 5, 1943 |
| 2,321,336 | Tondreau | June 8, 1943 |
| 2,441,675 | Simmon | May 18, 1948 |
| 2,553,622 | Zander | May 22, 1951 |

FOREIGN PATENTS

| Number | Country | Date |
| --- | --- | --- |
| 316,601 | Great Britain | of 1929 |
| 605,721 | Germany | of 1934 |